No. 640,533. Patented Jan. 2, 1900.
W. CALLAHAN.
CABLE TERMINAL.
(Application filed Dec. 6, 1898.)
(No Model.) 2 Sheets—Sheet 1.

WITNESSES:
M. T. Bloudel,
Edw. W. Byrn

INVENTOR
William Callahan.
BY Munn & Co.
ATTORNEYS.

No. 640,533. Patented Jan. 2, 1900.
W. CALLAHAN.
CABLE TERMINAL.
(Application filed Dec. 6, 1898.)
(No Model.) 2 Sheets—Sheet 2.
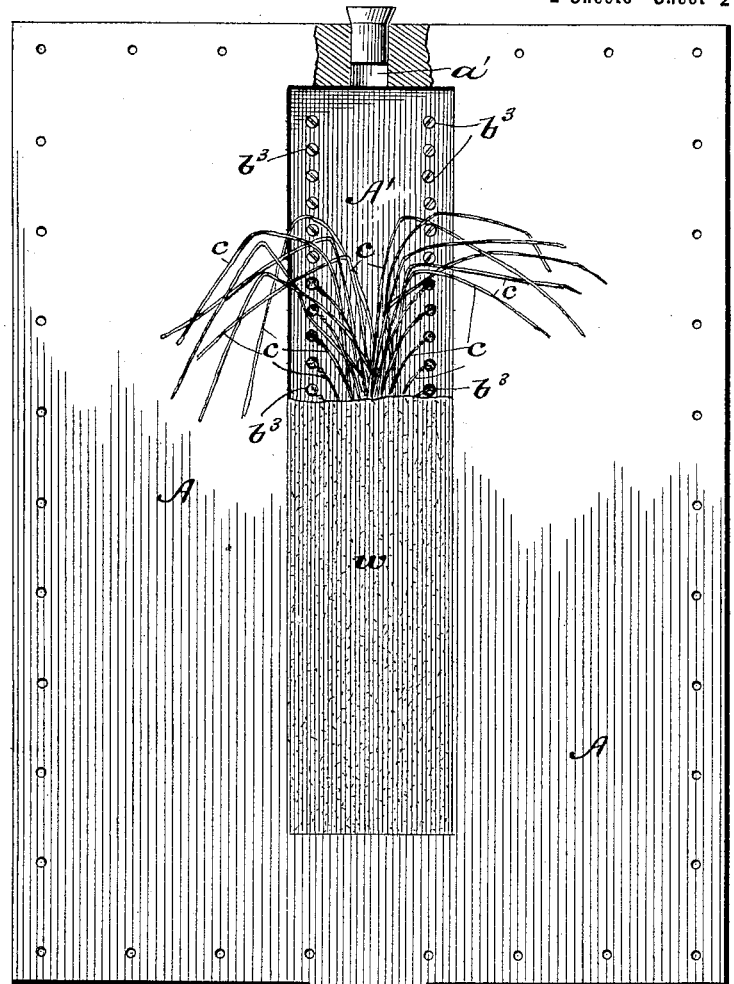
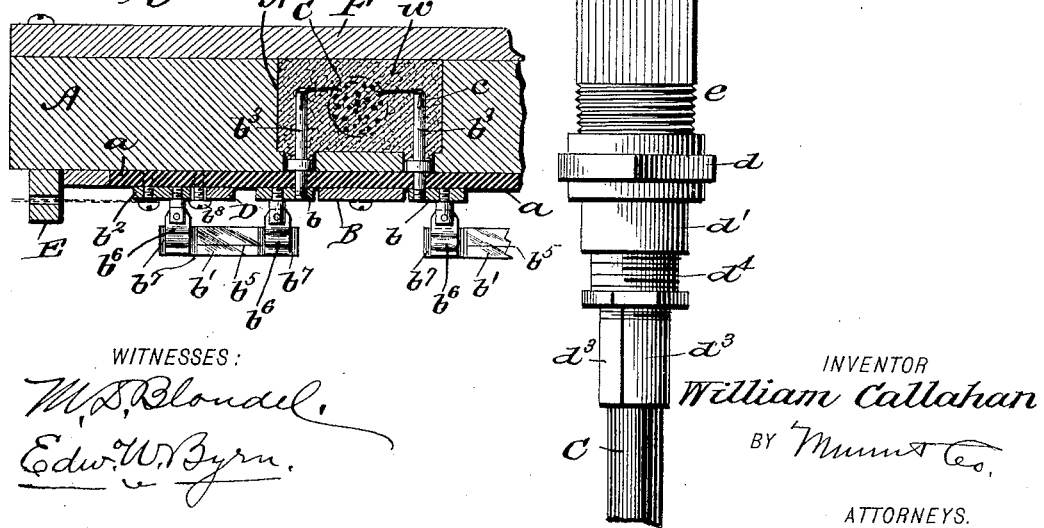
WITNESSES:
INVENTOR
William Callahan
BY
ATTORNEYS.

UNITED STATES PATENT OFFICE.

WILLIAM CALLAHAN, OF TOLEDO, OHIO.

CABLE-TERMINAL.

SPECIFICATION forming part of Letters Patent No. 640,533, dated January 2, 1900.

Application filed December 6, 1898. Serial No. 698,471. (No model.)

*To all whom it may concern:*

Be it known that I, WILLIAM CALLAHAN, of Toledo, in the county of Lucas and State of Ohio, have invented a new and useful Improvement in Cable-Terminals, of which the following is a specification.

My invention is in the nature of a cable-terminal to be used in making connections with aerial telephone-wires where it is necessary to place the same on a pole or at any other place where a cable terminates. Its object is to furnish a neat and convenient means for making connections, with provision for receiving and conducting away the accidental heavy charges from lightning or the crossing of the lines with high-tension electric-light wires and with provision, also, for preventing the creeping of moisture into the strands of the cable at its terminal; and it consists in the special construction and arrangement of a device for these purposes which I will now proceed to describe, with reference to the drawings, in which—

Figure 1:
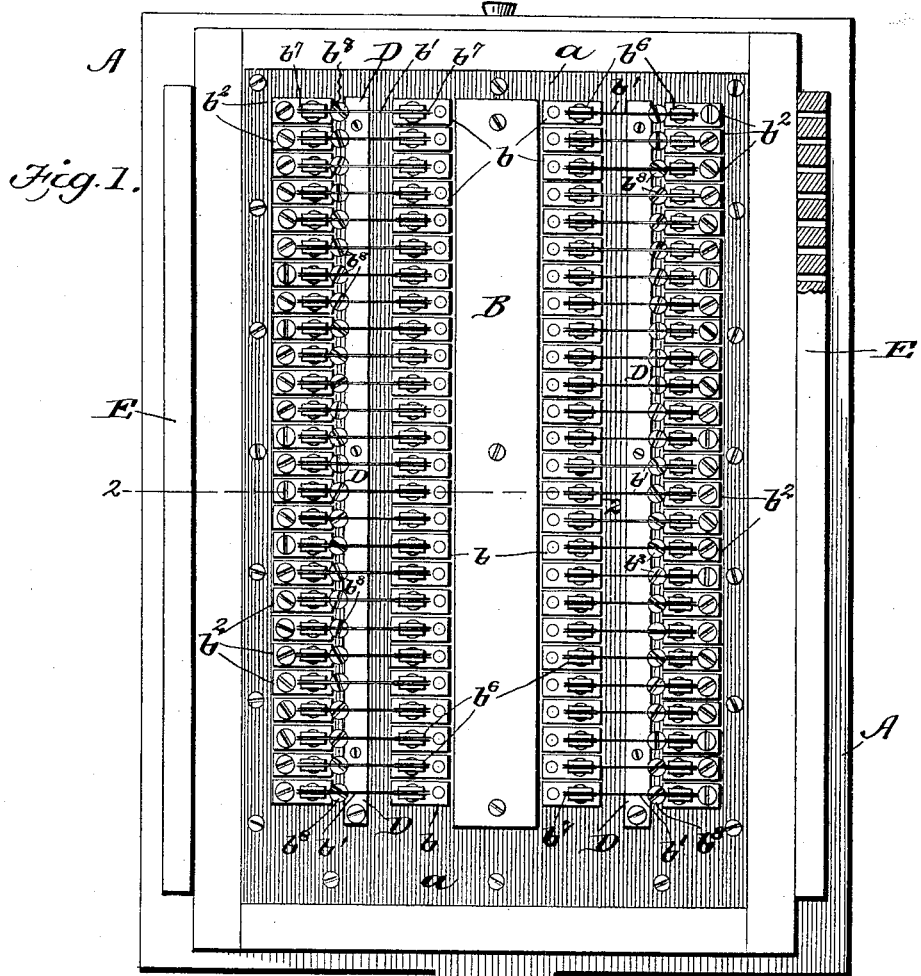
Figure 5:
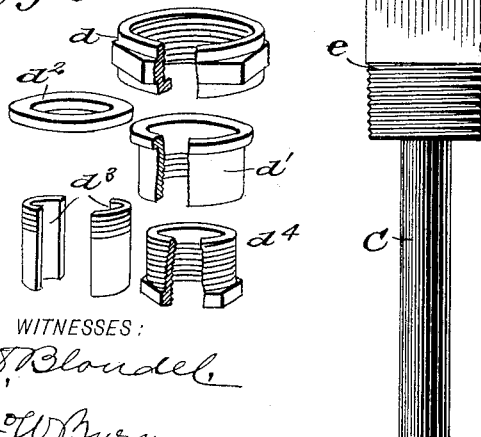
Figure 4:
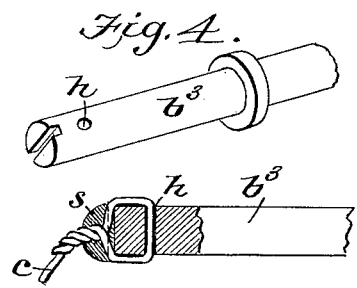

Figure 1 is a face view of the device, partly in section; Fig. 2, a transverse section on line 2 2 of Fig. 1, and Fig. 3 a rear view with the detachable back removed and part of the cable-strands disconnected. Figs. 4 and 5 are details.

In the drawings, A represents a rectangular block which on its back side is hollowed out to form an elongated chamber $A'$ and on its front side has fixed thereon a non-conducting plate $a$, of hard rubber or other insulating material, on which the various electrical connections are mounted. These consist of a middle longitudinally-arranged metal plate B, which forms a common ground connection to protect all the wires from high-tension currents. This plate is not in direct contact with the other electrical connections which are arranged on both sides of it, but is placed so close to them all that a high-tension current will leap to the same and pass to the ground. On opposite sides of this plate B are disposed two series of electrical connections of the same construction and arrangement. A description of the series on the right will serve also for the one on the left. Each consists of a series of small metal plates $b$ and small metal plates $b^2$, insulated from each other and bearing bifurcated clasp-springs $b^6 b^6$. Between the two blades of each spring-clasp are detachably retained the ends of a bridge-piece of mica $b'$. This piece of mica has adhering to it and embedded in a film of non-conducting varnish a fusible wire $b^5$, Fig. 2, which at its ends is in contact with a wrapping of tin-foil $b^7$, placed around the ends of the mica and in direct electrical contact with the spring-jaws of the clasps $b^6$. This connection permits electrical currents of a definite tension to pass without damage to the wire $b^5$; but high-tension currents will fuse it and break the connection. The plates $b$ have insulated screw-stems $b^8$, that pass back into the hollow chamber $A'$ and there connect with the various strands $c$ of the cable C. To make this connection, the screws are provided, near their ends, with a transverse hole $h$, Fig. 4, and the ends are nicked like the head of a screw, and the wire is first passed through the transverse hole, then wrapped and twisted, so as to lie in the nick, and is then soldered thereto at $s$ with a firm and positive electrical connection in a manner that is at once convenient and effective in making a permanent connection. Each strand $c$ of the cable, it will be understood, is connected in this way to its individual plate $b$, and through the fusible connection to the other plate $b^2$. After all the strands are connected the back F is placed over the chamber $A'$ and is screwed fast to inclose all the terminal connections of the cable, and then a wax or plastic insulating composition $w$ is melted or poured into the chamber $A'$ through a hole $a'$ at the top and is made to fill the said chamber and surround each terminal connection with a hermetically-sealing matrix, that most perfectly incloses the same and prevents all moisture from entering the cable at its terminal and effectually prevents short-circuiting or leakage of current from the strands of the cable.

At the point where the cable C enters the block A the latter has a projecting sleeve $e$, with an external screw-thread, onto which there screws a union-coupling consisting of ring-sections $d$ $d'$ $d^2$ $d^4$ and split tube-sections $d^3$, Figs. 3 and 5. This takes the place of a wiped joint heretofore used and does away with the expense of a plumber.

On the face of the device, just between the rows of plates $b$ on one side and $b^2$ on the other, there is on each side of the middle plate B a continuous parallel metal strip D, placed close enough to all the small plates $b^2$ to be connected to them electrically by a set-screw $b^8$ or be disconnected therefrom by simply turning the screws $b^8$ backward, so that their heads do not any longer overlap and come in contact with both the strip D and the small plates $b^2$. The purpose of this common conducting-strip is as follows: There are two kinds of telephone systems—one the individual metallic system and the other the common return-wire system, where one large wire is used to connect with one side of all the telephones and acts as a negative or ground wire. These strips D are for the use of this latter system, and it will readily be seen that each strip D may through its screws $b^8$ be put in connection with all the plates $b^2$ on one side of the instrument and in turn be connected to the common return-wire.

On each side of the frame-block A there is a wooden side rail E, having holes through it, one for each plate $b^2$, and through these holes pass the aerial wires from the outside to connect with the cable-terminals, which makes a neat and convenient arrangement.

Having thus described my invention, what I claim as new, and desire to secure by Letters Patent, is—

1. An electric-cable terminal consisting of an inclosing frame having a chamber on its rear side with a detachable back, a series of insulated metal contacts on its face having conducting extensions through into the rear chamber, a union screw-coupling for the entrance of the cable at one end, and an opening into the chamber for filling the chamber with an insulating material substantially as shown and described.

2. An electric-cable terminal, consisting of an inclosing frame having a chamber in its rear with a detachable back, an insulated ground-plate B in the middle of the front face, a series of insulated metal plates $b$ on each side thereof with clasp-springs and extensions back into the hollow chamber, a parallel series of insulated plates $b^2$ with clasp-springs and bridge-piece $b'$ of non-conducting material having fusible conductors connecting the said clasp-springs substantially as and for the purpose described.

3. An electric-cable terminal, consisting of an inclosing frame having a chamber in its rear with a detachable back, an insulated ground-plate B in the middle of its front face, a series of insulated metal plates $b$ on each side thereof with clasp-springs and extensions back into the hollow chamber, a parallel series of insulated plates $b^2$ with clasp-springs, a series of bridge-pieces $b'$ of non-conducting material having fusible conductors connecting the said clasp-springs, and the continuous metal conductors D arranged adjacent to the plates $b^2$ and having an adjustable electrical connection with each of the plates $b^2$ substantially as and for the purpose described.

4. An electrical connection for a wire-terminal consisting of a metal stem with a hole transversely through it near its end, and a nick in the end, and a wire passed through the hole and wrapped in the nick and then soldered to the stem substantially as and for the purpose described.

WILLIAM CALLAHAN.

Witnesses:
JAMES S. BRAILEY, Jr.,
JOHN E. MEEK.